United States Patent

Wold, Jr. et al.

[11] Patent Number: 5,163,243
[45] Date of Patent: Nov. 17, 1992

[54] FISHING AUTOMATIC TIP-UP

[76] Inventors: George R. Wold, Jr., 380 Oriole Trail, Crystal Lake, Ill. 60014; Thomas G. Zingrone, 901 N. Cold Spring Rd., Woodstock, Ill. 60098

[21] Appl. No.: 891,437

[22] Filed: May 29, 1992

[51] Int. Cl.⁵ ............................................. A01K 85/01
[52] U.S. Cl. ............................................. 43/17; 43/15
[58] Field of Search ............................ 43/17, 16, 15

[56] References Cited

U.S. PATENT DOCUMENTS

| | | |
|---|---|---|
| 380,899 | 4/1888 | Jones . |
| 1,451,254 | 4/1923 | Stolze . |
| 1,870,782 | 8/1932 | Minutilli . |
| 1,980,255 | 11/1934 | Covich . |
| 1,995,067 | 3/1935 | Killory . |
| 2,032,537 | 3/1936 | Kozikowski . |
| 2,045,063 | 6/1936 | Baranowski . |
| 2,195,356 | 3/1940 | Biddinger ............... 43/17 |
| 2,518,517 | 8/1950 | Baulski . |
| 2,785,493 | 3/1957 | Thiel .................... 43/17 |
| 3,474,561 | 10/1969 | McConkey . |
| 4,083,139 | 4/1978 | Schwend . |
| 4,120,111 | 10/1978 | Young, Jr. ............... 43/17 |
| 4,228,609 | 10/1980 | Gonnello . |
| 4,349,977 | 9/1982 | Brodribb et al. ......... 43/15 |
| 4,449,317 | 5/1984 | Brodribb et al. ......... 43/15 |
| 4,651,459 | 3/1987 | Wurtz . |
| 4,685,240 | 8/1987 | Fralick . |
| 4,907,363 | 3/1990 | Dury . |
| 5,050,333 | 9/1991 | Debreczeni . |
| 5,074,072 | 12/1991 | Serocki . |

Primary Examiner—Richard K. Seidel
Assistant Examiner—Chuck Y. Mah
Attorney, Agent, or Firm—Anthony S. Zummer

[57] ABSTRACT

A fishing automatic tip-up particularly adapted for use in ice fishing including a collapsible base which is positionable over a hole in an ice covered body of water. A pivotedly mounted post is connected to the base to be positioned in a substantially upright position. A resilient flag support is mounted on the post and has a signal flag mounted on the flag support. An automatic rewind fishing reel is mounted on the post for receiving a fishing line. A latch is releasably connectable with the fishing reel to prevent selectively the fishing reel from rewinding the fishing line. Disengagement of the latch from the fishing reel allows the fishing reel to rewind the fishing line.

16 Claims, 2 Drawing Sheets

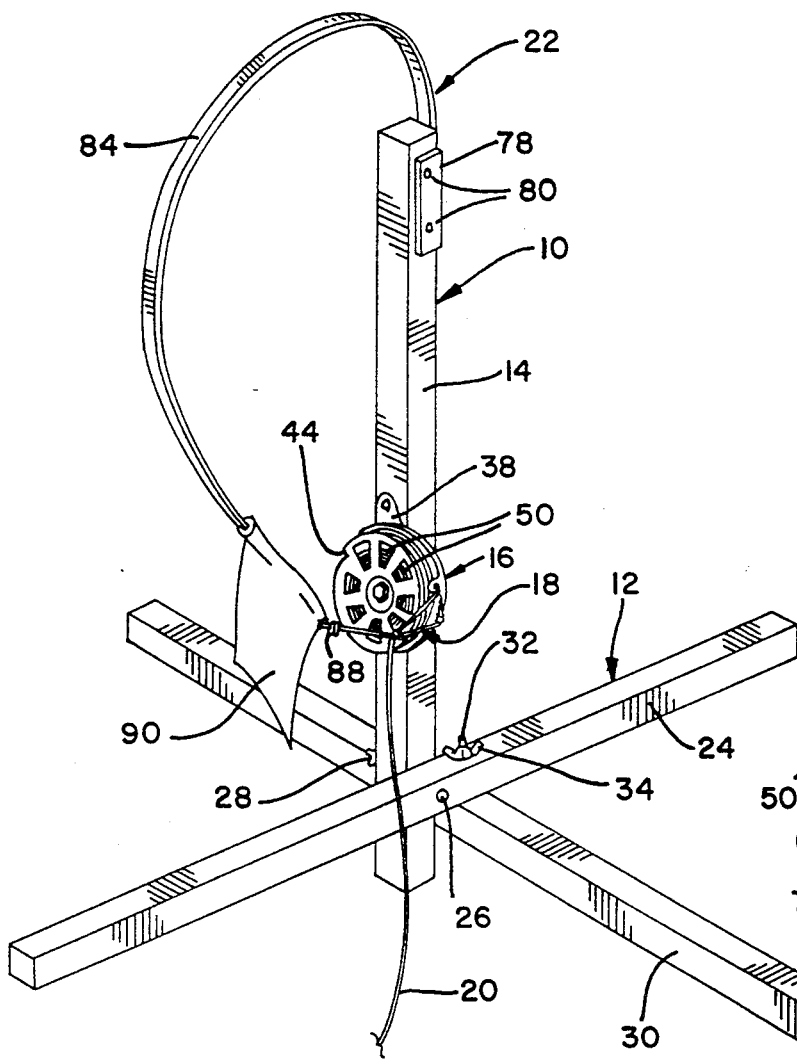
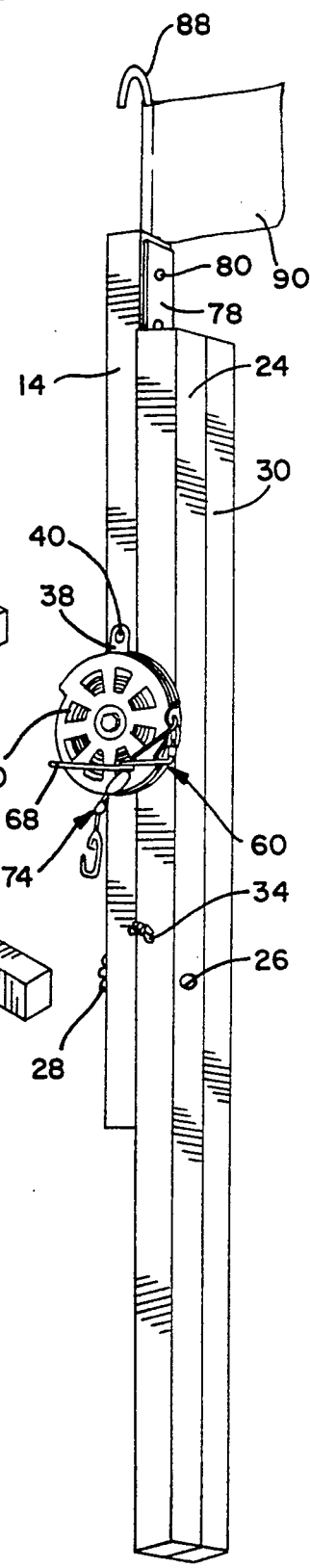
FIG. 1
FIG. 2

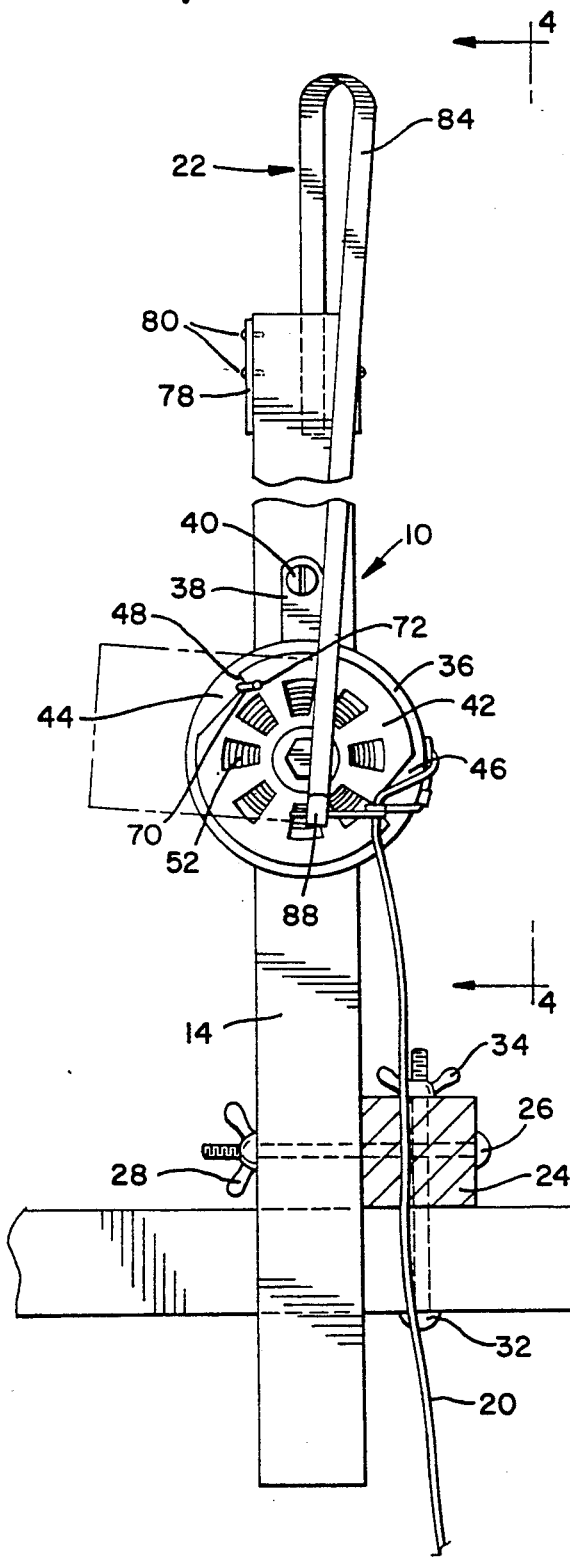
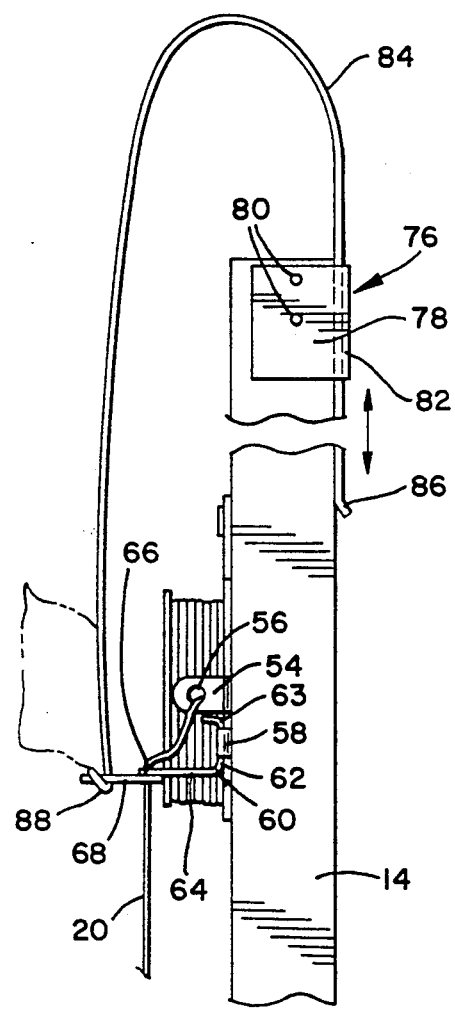

1

FISHING AUTOMATIC TIP-UP

BACKGROUND OF THE INVENTION

In the sport of ice fishing, ice fisherman makes a hole in ice covering a body of water. The ice fisherman then fishes through the hole in the ice. Typically, the area where ice fishermen fish is unprotected, and in cold weather, wind blowing across the ice sheet makes it desireable for an ice fisherman to seek some form of shelter. As a result, an ice fisherman finds it convenient to use some form of tip-up device which allows the ice fisherman to leave the immediate area of the hole in the ice. Thus, he may stay in a sheltered area or in a vehicle and watch his tip-up, and thereby observe whether a fish has taken his bait.

The utilization of a tip-up having an automatic windup mechanism is well known. U.S. Pat. No. 4,651,459 to Wurtz, entitled "Automatic Fishing Device", dated Mar. 24, 1987, discloses a fishing device which has a windup mechanism for winding the fishing line onto a reel. The Wurtz device relies upon a stop number to prevent the line from being wound onto the reel. The disadvantage to the Wurtz device is that the stop member must be positioned on the line so that it is difficult to make adjustments to the depth of bait on the line. Furthermore, the stop member must be wound onto the reel.

Another patent disclosing an ice fishing rig is U.S. Pat. No. 3,474,561 to Alfred R. McConkey, entitled "Ice Fishing Rig With Self Contained Automatic Catcher". The McConkey patent issued Oct. 28, 1969. The McConkey device provides a platform for positioning over a hole in the ice. A resilient main arm portion is locked in a down position. When there is a bite on the fishing line, a trigger mechanism is released which allows the arm portion to move up and activate an automatic pull responsive device to reel in the fishing line.

An object of this invention is to provide an improved automatic tip-up for use in fishing. The tip-up has an automatic rewind fishing reel and a latch releasably engageable with the fishing reel to prevent rewinding of the fishing reel. The latch is disengaged from the fishing reel when a fish pulls on fishing line storable on the fishing reel and connected to the latch. Disengagement of the latch from the fishing reel allows the reel to wind the fishing line onto the reel.

Another object of the present invention is to provide a fishing automatic tip-up with an automatic rewind fishing reel and a resilient flag support wherein a bite on a fishing line connected to the fishing reel allows the flag support to make a quick release of the fishing reel to wind quickly the fishing line onto the reel thereby set a hook in a fish biting on the line.

Still another object of the instant invention is to provide an improved fishing automatic tip-up which has an automatic rewind fishing reel which tip-up is convenient to transport and store.

Other objects and uses of the herein disclosed fishing automatic tip-up will become readily apparent to those skilled in the art upon consideration of the accompanying drawings and the following description of the preferred embodiment.

SUMMARY OF THE INVENTION

The present invention is directed to an improved fishing automatic tip-up which is particularly adapted for use in ice fishing. The present tip-up includes a collapsible base which is positionable over an opening in a sheet of ice. A post is pivotally connected to the base so that parts of the base and post may be folded to be parallel to each other for ease in storage and transportation of the tip-up. A resilient flag support is mounted on the post. A flag is mounted on the flag support. A flag support clamp is mounted on the post and slightably receives the flag support to hold the flag support at a selected position along the length of the post to allow the flag support to be substantially aligned with the post and thereby reduce the size of the tip-up when stored or transported. An automatic rewind fishing reel is mounted on the post and a fishing line is windably mounted on the fishing reel. The fishing reel has a notch in the reel for receiving a latch which latch is pivotally mounted on the post. The latch is releasably connectable with the fishing reel to prevent the fishing reel from rewinding when the latch is in the notch, but when the latch is removed from the notch, the fishing reel winds the fishing line onto the fishing reel.

BRIEF DESCRIPTION OF THE DRAWINGS

FIG. 1 is a perspective view of a fishing automatic tip-up embodying the herein disclosed invention shown in an attitude for catching fish;

FIG. 2 is a perspective view of the automatic tip-up shown in FIG. 1 but being collapsed in an attitude for storage and transportation;

FIG. 3 is an enlarged fragmentary side view of the tip-up shown in FIG. 1 showing a flag in phantom and showing a flag support bent to engage a latch;

FIG. 4 is an end view taken on line 4—4 of FIG. 3 showing an automatic rewind fishing reel mounted on a post with a flag support connected to a latch connected to the fishing reel.

DESCRIPTION OF THE PREFERRED EMBODIMENT

Referring now to the drawings and especially to FIG. 1, a fishing automatic tip-up embodying the herein disclosed invention is generally indicated by numeral 10. Tip-up 10 generally includes a base 12 and a post 14 pivotally connected to the base. An automatic rewind fishing reel 16 is mounted on the post. A latch assembly 18 is mounted on the post and is releasably connectable with the fishing reel. A conventional fishing line 20 is windably mounted on the fishing reel and is connected to latch assembly 18. A flag assembly 22 is mounted on the upper end of post 14 and has a portion which is releasably connectable to latch assembly 18.

Post 14 is a polyvinyl chloride shaft having a square cross section. Base 12 includes an arm 24 also a polyvinyl chloride square shaft which is pivotally connected to post 14 by a bolt 26 having a wing nut 28. A second arm 30 is also a polyvinyl chloride square shaft which is connected to arm 24 by a bolt 32 having a wing nut 34. Thus, arms 24 and 30 may be aligned substantially parallel to each other by pivoting arm 30 on bolt 32. The two arms 24 and 30 then may be aligned substantially parallel to post 14 to the attitude shown in FIG. 2 by pivoting arm 24 about bolt 26. Provision of wing nuts on the bolts, allows the fisherman to lock the arms and post together or to loosen the parts to facilitate positioning of the parts.

Automatic rewind fishing reel 16 is a conventional automatic rewind fishing reel which is commercially available. Fishing reel 16 includes a mounting plate 36 with a mounting ear 38 formed integral therewith. A mounting screw 40 is positioned in the mounting ear and is secured in post 14 to hold the fishing reel onto the post. The fishing reel includes a face plate 42 rotatably mounted on the mounting plate. The face plate has a pair of identical latch notches 44 and 46 formed in its outer periphery. Notches 44 and 46 are spaced 180° apart on face plate 42. Each of the notches includes a hook like receptacle surface 48 for receipt of a portion of the latch assembly. The face plate has a plurality of lips formed therein by knocking out the lips to form openings 50. The lips form a reel surface for supporting the fishing line. The lips are not shown herein in as much as they are conventional. A conventional retraction spring 52 is mounted within the lips and is visible through openings 50. A line bar 54 is formed integral with mounting plate 36 and extends toward face plate 42. Line bar 54 includes a line port 56 which receives line 20.

Latch assembly 18 includes a latch mount 58 which is formed integral with mounting plate 36. A latch 60 is pivotally mounted in latch mount 58. Latch 60 includes a mounting stud 62 which is pivotally mounted in the latch mount. A latch dog 63 is found integral with one end of stud 62 to hold the latch in the mount in one direction. A latch arm 64 is formed integral with the other end of the mounting stud and is substantially perpendicular to the mounting stud. A line eye 66 is formed integral with the latch arm by bending a loop into the latch. The line eye has a flag arm 68 extending therefrom. The latch arm is pivotal about the latch mount and is positionable in one of the latch notches in face plate 42 to prevent the reel from rotating in one direction, namely, counterclockwise as viewed in FIG. 3.

The fishing line 20 is a conventional fishing line which has one end 70 tied to an opening 72 in face plate 42. The fishing line is wound on to the fishing reel by positioning the line on the lips formed in the face plate which lips extend toward the mounting plate. The fishing line has a conventional terminal assembly 74 secured to the other end. The fishing line passes through line port 56 of the line bar and through line eye 66 of latch 60. The terminal assembly 74 engages line eye 66 and thereby prevents the line from passing completely through the line eye to limit winding of the fishing line onto the reel.

Flag assembly 22 includes a flag support clamp 76 which is secured to the upper end of post 14. The flag support clamp includes a pair of identical mounting plates 78 which are secured to the post by conventional screws 80. The mounting plates are connected by a retainer plate 82 which is formed integral with the mounting plates. The retainer plate 82 is spaced a small distance from the post to receive a flag support 84. The flag support is a conventional elongated piece of spring steel strip which has a stop finger 86 at one end and a latch hook 88 at the other end. The latch hook is releasably engageable with flag arm 68 of latch 60. A flag 90 is secured to the end of the flag support adjacent to the latch hook. In this instance, the flag is a sheet plastic flag being blaze orange in color. However, any other suitable color and material may be used for the flag.

The instant automatic tip-up is stored and transported with the arms parallel to the post as shown in FIG. 2 with the flag support 84 positioned along the post so that flag 90 is positioned adjacent to the flag support clamp 76. The tip-up is readily adjusted for use by pivoting arm 24 relative to the post and pivoting arm 30 relative to arm 24 to the attitude shown in FIG. 1. The base thus may be placed over a hole in the ice. The flag support is readily moved through the flag support clamp until stop finger 86 engages the retainer plate 82. The flag support may be readily positioned along its length at a selected position along port 14. A selected hook and bait is connected to terminal assembly 74 and dropped into the water through the hole. A selected amount of line is pulled from the reel through line eye 66 and line port 56. Once a sufficient quantity of fishing line has been unwound from the reel, latch 60 is pivoted about latch mount 56 so that latch arm 64 is positioned in either latch notch 44 or 46 in engagement with the appropriate receptacle portion. Spring 52 tends to rotate the reel to rewind the fishing line on to the reel. The spring constantly urges the reel to rotate in a counterclockwise direction as shown in FIG. 3, thus holding the latch into firm engagement with the face plate.

The flag assembly is placed into position once the selected amount of fishing line has been extended. The flag support is bent downward to place the latch hook under the flag arm to hold the flag in a down attitude adjacent to the fishing reel. The automatic tip-up is now ready for its normal operation.

When a fish pulls on the fishing line, the force applied to the fishing line rotates fishing reel in a clockwise direction, as viewed in FIG. 3, so that the latch arm 46 is pulled out of engagement with the selected latch notch by the force on the fishing line. As soon as the latch arm is no longer in a notch, the resilience of flag support 84 snaps flag arm 68 away from face plate 42 to pivot latch 60 and thereby free the automatic rewind fishing reel. Pivoting of the latch about the latch mount allows latch hook 88 of the flag support to disengage flag arm 68. The resilience of the flag support causes the flag to be raised to an upright attitude and simultaneous disengagement of the latch arm from the latch notch allows spring 52 to rotate the reel in a counterclockwise direction and thereby wind the fishing line onto the reel. The winding of the fishing line sets the hook in the fish and raises the fish toward the opening in the ice. The flag in the raised position serves as a signal to the ice fisherman that a fish has been caught on automatic tip-up 10.

Once the fisherman has completed his fishing expedition, the fisherman may easily and conveniently position the parts of the automatic tip-up for transportation and storage as described above.

Although a specific embodiment of the herein disclosed invention has been described in detail above and is shown in detail in the accompanying drawings, it is readily apparent that those skilled in the art may make a variety of modifications and changes without departing from the spirit and scope of this invention. It is to be expressly understood that the present invention is limited only by the appended claims.

We claim:

1. An automatic tip-up for use in fishing, comprising, in combination, a base, a post connected to the base, a resilient flag support mounted on the post, an automatic rewind fishing reel mounted on the post, a latch releasably connectable with the fishing reel for selectively preventing the fishing reel from rewinding, and a fishing line removably wound onto the fishing reel and operably connected to the latch to disconnect the latch from the fishing reel to allow the fishing reel to rewind the fishing line onto the reel when a force is applied to the line in a direction to remove more fishing line from the reel.

2. An automatic tip-up for use in fishing as defined in claim 1, wherein said flag support has one end releasably connectable with the latch, and movement of the latch from connection with the fishing reel allows the fishing reel to rewind, the flag support being disconnectable from the latch to allow the flag support to be extended when the fishing reel is allowed to rewind, and a flag mounted on the flag support adjacent to the one end.

3. An automatic tip-up for use in fishing as defined in claim 1, wherein said fishing reel has a notch for releasably receiving the latch to prevent the fishing reel from rewinding the fishing line when the latch is in the notch.

4. An automatic tip-up for use in fishing as defined in claim 1, wherein said latch is pivotally connected to the post, said flag support being releasably connectable with the latch to pivot the latch when the latch disengages the fishing reel.

5. An automatic tip-up for use in fishing as defined in claim including, a flag support clamp mounted on the post slideably receiving the flag support to hold the flag support at its length at a selected position along the length of the post.

6. An automatic tip-up for use in fishing as defined in claim 1, wherein said base includes a pair of arms pivotally connected to each other, said post being pivotally connected to one of said arms to allow the post and the two arms to be aligned substantially parallel to each other.

7. An automatic tip-up for use in fishing as defined in claim 1, wherein said fishing reel has a notch for releasably receiving the latch to prevent the fishing reel from rewinding the fishing line when the latch is in the notch, and a flag mounted on the flag support adjacent to one end thereof, the one end of said flag support being releasably connectable with the latch, whereby disengagement of the latch from the notch allows the flag support to move the latch away from the fishing reel and the fishing reel is allowed to rewind the fishing line onto the reel.

8. An automatic tip-up for use in fishing as defined in claim 1, including, a flag mounted on the flag support adjacent to one end thereof, said flag support having the one end releasably connectable to the latch and disconnectable from the latch to allow the flag to be raised when the fishing reel is allowed to rewind fishing line onto the reel, said latch being pivotally mounted on the post.

9. An automatic tip-up for use in fishing as defined in claim 1, including, a flag mounted on the flag support adjacent to one end thereof, said flag support having the one end releasably connectable with the latch to be disconnectable from the latch to allow the flag to be raised when the fishing reel is allowed to rewind fishing line onto the reel, and a flag support clamp mounted on the post slideably receiving the flag support to hold the flag support at its length at a selected position along the length of the post.

10. An automatic tip-up for use in fishing as defined in claim 1, wherein said latch is pivotally mounted on the post, said fishing reel has a notch for releasably receiving the latch to prevent the fishing reel from rewinding when the latch is in the notch, whereby disconnection of the latch from the fishing reel allows the flag support to pivot the latch away from the fishing reel to allow the fishing reel to rewind and substantially simultaneously the flag support extends upward.

11. An automatic tip-up for use in fishing as defined in claim 1, wherein said fishing reel has a notch for releasably receiving the latch to prevent the fishing reel from rewinding when the latch is in the notch, and a flag support clamp mounted on the post slideably receiving the flag support to hold the flag support at its length at a selected position along the length of the post.

12. An automatic tip-up for use in fishing as defined in claim 1, wherein said base includes a pair of arms pivotally connected to each other, said post being pivotally connected to one of said arms to allow the post and the two arms to be aligned substantially parallel to each other, and said fishing reel has a notch for releasably receiving the latch to prevent the fishing reel from rewinding when the latch is in the notch.

13. An automatic tip-up for use in fishing as defined in claim including, a flag support clamp mounted on the post slideably receiving the flag support to hold the flag support at its length at a selected position along the length of the post, said base including a pair of arms pivotally connected to each other, and said post being pivotally connected to one of said arms to allow the post and the two arms to be aligned substantially parallel to each other.

14. An automatic tip-up for use in fishing as defined in claim wherein, said latch is pivotally mounted on the post, said fishing reel has a notch for releasably receiving the latch to prevent the fishing reel from rewinding when the latch is in the notch, a flag mounted on the resilient flag support adjacent to one end thereof, said flag support having the one end releasably connectable with the latch pivot the latch from connection with the fishing reel to allow the fishing reel to rewind, the flag support being selectively disconnectable from the latch to allow the flag to be raised when the fishing reel is allowed to rewind fishing line onto the reel, and when the latch is pivoted away from the fishing reel and out of the notch, the fishing reel rewinds fishing line onto the reel.

15. An automatic tip-up for use in fishing as defined in claim 1, including, a flag mounted on the resilient flag support adjacent to one end thereof, said latch being pivotally mounted on the post, said fishing reel having a notch for releasable receiving the latch to prevent the fishing reel from rewinding when the latch is in the notch, said flag support having the one end releasably connectable with the latch and to be selectively disconnectable from the latch to allow the flag to be raised when the fishing reel is allowed to rewind, and a flag support clamp mounted on the post slideably receiving the flag support to hold the flag support at a selected position along the length of the post.

16. An automatic tip-up for use in fishing as defined in claim 1, including, a flag mounted on the resilient flag support adjacent to one end thereof, said latch being pivotally mounted on the post, said fishing reel having a notch for releasably receiving the latch to prevent the fishing reel from rewinding when the latch is in the notch, said flag support being an elongated flat spring steel strip having the one end releasably connectable with the latch and to be selectively disconnectable from the latch to allow the flag to be raised when the fishing reel is allowed to rewind, a flag support clamp mounted on the post slideably receiving the flag support to hold the flag support at a selected position along the length of the post, and said base including a pair of arms pivotally connected to each other, said post being pivotally connected to one of said arms to allow the post and the two arms to be aligned substantially parallel to each other for transportation and storage.

* * * * *

UNITED STATES PATENT AND TRADEMARK OFFICE
CERTIFICATE OF CORRECTION

PATENT NO. : 5,163,243
DATED : November 17, 1992
INVENTOR(S) : George R. Wold, Jr. and Thomas G. Zingrone It is certified that error appears in the above-indentified patent and that said Letters Patent is hereby corrected as shown below:

Column 1, line 3, in the first line after "Background Of The Invention" insert -- an -- before "ice"

Column 6, line 16, after "claim" insert -- 1, --

Column 6, line 25, after "claim" insert -- 1, --

Signed and Sealed this

Twelfth Day of October, 1993

Attest:

BRUCE LEHMAN

Attesting Officer

Commissioner of Patents and Trademarks